United States Patent
Kim

(10) Patent No.: US 11,386,806 B2
(45) Date of Patent: Jul. 12, 2022

(54) PHYSICAL MOVEMENT ANALYSIS

(71) Applicant: Ssam Sports, Inc., Allendale, NJ (US)

(72) Inventor: Sang J. Kim, Allendale, NJ (US)

(73) Assignee: Ssam Sports, Inc., Allendale, NJ (US)

(*) Notice: Subject to any disclaimer, the term of this patent is extended or adjusted under 35 U.S.C. 154(b) by 496 days.

(21) Appl. No.: 16/388,006

(22) Filed: Apr. 18, 2019

(65) Prior Publication Data
US 2019/0325780 A1 Oct. 24, 2019

Related U.S. Application Data

(60) Provisional application No. 62/659,848, filed on Apr. 19, 2018.

(51) Int. Cl.
| | |
|---|---|
| A63B 71/06 | (2006.01) |
| G09B 19/00 | (2006.01) |
| G06N 20/00 | (2019.01) |
| G06N 5/04 | (2006.01) |
| G06F 3/01 | (2006.01) |

(52) U.S. Cl.
CPC ............ *G09B 19/003* (2013.01); *G06F 3/011* (2013.01); *G06N 5/04* (2013.01); *G06N 20/00* (2019.01); *A63B 71/0622* (2013.01); *A63B 2071/065* (2013.01); *A63B 2220/803* (2013.01); *A63B 2220/836* (2013.01); *G09B 19/0038* (2013.01)

(58) Field of Classification Search
CPC ...................................................... G06F 3/011
See application file for complete search history.

(56) References Cited

U.S. PATENT DOCUMENTS

| | | |
|---|---|---|
| 2013/0029791 A1 | 1/2013 | Rose et al. |
| 2016/0121193 A1 | 5/2016 | Marty et al. |
| 2017/0055918 A1* | 3/2017 | Hughes .............. A63B 24/0003 |
| 2017/0281054 A1* | 10/2017 | Stever .................... A61B 5/1114 |
| 2017/0287146 A1* | 10/2017 | Pathak .................. G06T 7/0016 |
| 2018/0021653 A1 | 1/2018 | Thornbrue et al. |
| 2018/0093121 A1* | 4/2018 | Matsuura ......... A63B 21/00185 |
| 2018/0226155 A1* | 8/2018 | Mahoney ............... G16H 15/00 |

OTHER PUBLICATIONS

International Search Report and Written Opinion for International Application No. PCT/US2019/028383, dated Jul. 15, 2019, 11 pages.

* cited by examiner

*Primary Examiner* — Di Xiao
(74) *Attorney, Agent, or Firm* — Lowenstein Sandler LLP

(57) ABSTRACT

A processing device receives three dimensional (3D) motion capture data corresponding to a subject user performing a physical activity and receives attribute data associated with the subject user. The processing device determines a personalized reference data set for the subject user based on 3D motion capture data associated with a group of users performing the physical activity, wherein each user from the group of users shares at least a portion of the first attribute data with the subject user. The processing device provides the personalized reference data set as an input to a trained machine learning model and obtains an output of the trained machine learning model, wherein the output comprises a recommendation for the subject user pertaining to improvement of the physical activity.

17 Claims, 5 Drawing Sheets

PHYSICAL MOVEMENT ANALYSIS

RELATED APPLICATIONS

This application claims the benefit of U.S. Provisional Patent Application No. 62/659,848, filed Apr. 19, 2018, the entire contents of which are hereby incorporated by reference herein.

TECHNICAL FIELD

The present disclosure is generally related to computer systems, and is more specifically related to systems and methods for physical movement analysis.

BACKGROUND

Three dimensional (3D) motion visualization and data is used to analyze human motion in sports and health applications. 3D systems can provide useful information of angles, speed, etc. which can be used to identify poor movement for performance or health.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Embodiments for physical movement analysis are described herein. In one embodiment, an intelligent analysis framework is used to optimize human motion using three dimensional (3D) motion data captured and compared against a dynamically growing reference motion data set. The analysis frameworks uses a machine learning algorithm to dynamically create a series of personalized recommendations for a user, not just against a global ideal, but based on personal characteristics compared to those most similar to the user's.

Conventional systems can provide vast amounts of feedback information, but generally require an operator to go through all the data, graphs, etc., and to know what they are looking for and which information will be relevant to the user being analyzed. If such a system utilizes reference data at all, it generally still requires the operator to manually compare the captured data to the reference data and to make appropriate determinations about the captured movement being analyzed. This approach requires a deep understanding of optimal human movement and a potentially very time consuming process of filtering through the reference data and making comparisons to the captured motion data.

Aspects of the present disclosure address the above and other considerations by providing the intelligent analysis framework which utilizes a machine learning solution where new 3D motion data is captured and compared to a dynamically created personalized reference data subset based on personal characteristics of the user or users being analyzed. These characteristics can include, for example, demographics, level of proficiency, any user motion characteristics such as limitations of movement, desired outcomes, etc., and can be used to make personalized recommendations of adjustments and injury risk analysis, as well as a series of recommendations to make these adjustments in the form of text, images, video, audio etc.

The framework system may present this personalized analysis in such a way that the operator is not required to go through each data set and graph manually. Instead, they may be provided a dynamic recommendation report, which optionally includes a personalized training plan with recommendations to modify and/or improve the motion being performed in the motion capture analysis. As the user follows these recommendations and improves the motion, they may reduce the number of inefficient or improper movements until the system detects a satisfactory level of improvement from analysis of subsequent motion capture data.

Figure 1:
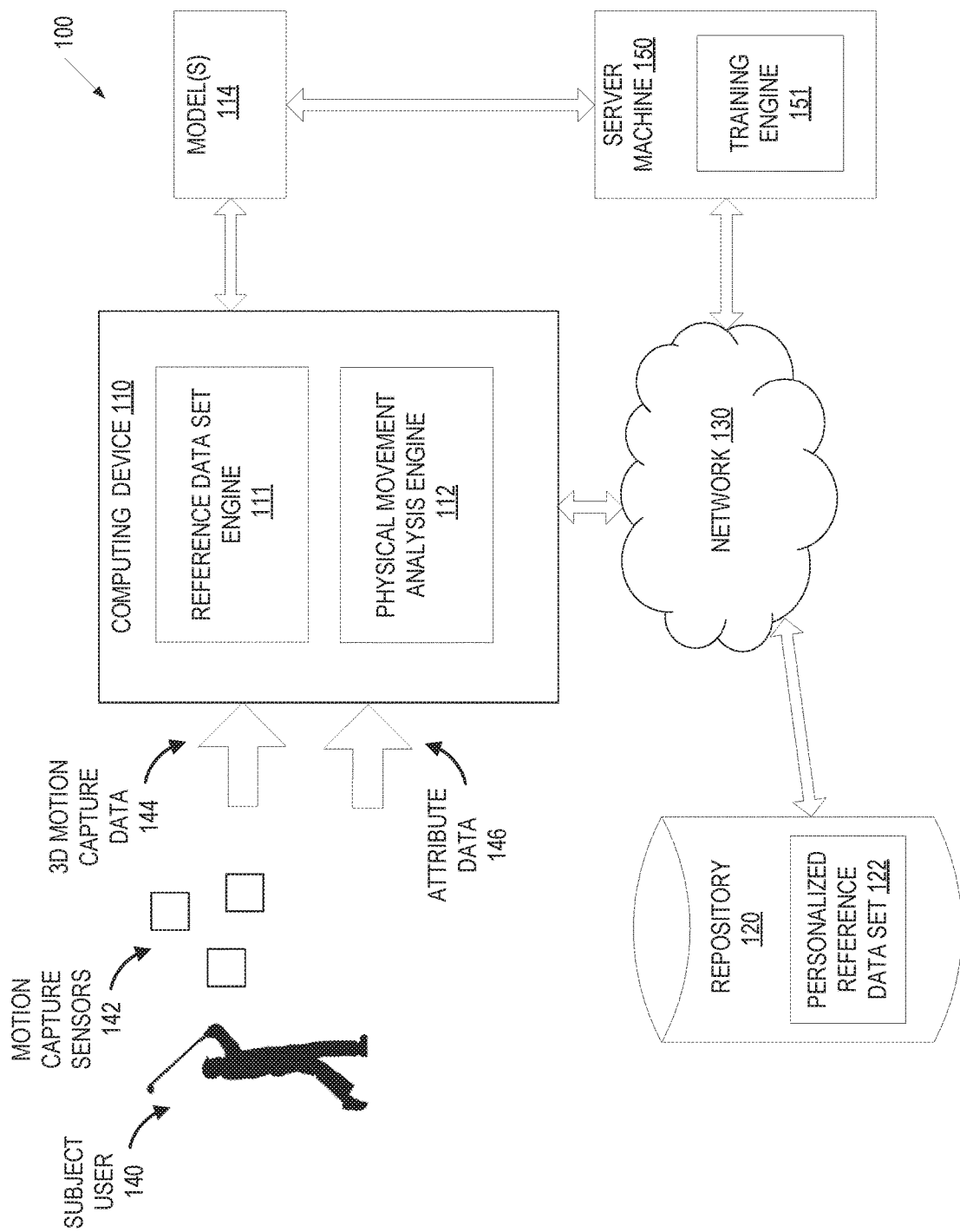
FIG. 1 depicts a high-level component diagram of an illustrative system architecture, in accordance with one or more aspects of the present disclosure.

FIG. 1 depicts a high-level component diagram of an illustrative system architecture 100, in accordance with one or more aspects of the present disclosure. System architecture 100 includes a computing device 110, a repository 120, and a server machine 150 connected to a network 130. Network 130 may be a public network (e.g., the Internet), a private network (e.g., a local area network (LAN) or wide area network (WAN)), or a combination thereof.

The computing device 110 may perform physical movement analysis using artificial intelligence to effectively optimize one or more body movements associated with a subject user 140 performing a physical activity. In one embodiment, computing device 110 may be a desktop computer, a laptop computer, a smartphone, a tablet computer, a server, or any suitable computing device capable of performing the techniques described herein. In one embodiment, a plurality of motion capture sensors 142, which may be affixed to one or more body parts of the subject user 140 while they are performing the physical activity, capture 3D motion capture data 144 corresponding to the subject user 140. In other embodiments, the motion capture sensors 142 may be affixed to any relevant object being manipulated by the subject user 140 while performing the physical activity, such as to a golf club, baseball bat, tennis racquet, can, crutches, prosthetics, etc. The 3D motion capture data 144 may be received by the computing device 110.

The 3D motion capture data 144 may be received in any suitable manner. For example, the motion capture sensors 142 may be wireless inertial sensors, each including for example, a gyroscope, magnetometer, accelerometer, and/or other components to measure sensor data including relative positional data, rotational data, and acceleration data. The 3D motion capture data 144 may include this sensor data and/or other data derived or calculated from the sensor data. The motion capture sensors 142 may transmit the 3D motion capture data 144 including, raw sensor data, filtered sensor data, or calculated sensor data, wirelessly to computing device 110 using internal radios or other communication mechanisms. In other embodiments, other systems may be used to capture 3D motion capture data 144, such as an optical system, using one or more cameras, a mechanical motion system, an electro-magnetic system, an infra-red system, etc. In addition, in other embodiments, the 3D motion capture data 144 may have been previously captured and stored in a database or other data store. In this embodiment, computing device 110 may receive the 3D motion capture data 144 from another computing device or storage device where the 3D motion capture data 144 is maintained. In still other embodiments, the 3D motion capture data 144 may be associated with other users besides subject user 140 performing the physical activity.

The 3D motion capture data 144 may be used to train a set of machine learning models or may be a new data for which physical movement analysis is to be performed. Accordingly, in the preliminary stages of processing, the 3D motion capture data 144 can be prepared for training the set of machine learning models or subsequent analysis.

The physical activity can be for example, swinging a golf club, throwing a ball, running, walking, jumping, sitting standing, or any other physical activity. When performing the physical activity, the subject user 140 and the other users in the group of users may make one or more body movements that together enable performance of the physical activity. For example, when swinging a golf club, the user may rotate their hips and shoulders, swing their arms, hinge their wrists, etc., each of which can be considered a separate body movement associated with performing the physical activity. Each physical activity may have its own unique set of associated body movements.

In one embodiment, computing device 110 may include a reference data set engine 111 and a physical movement analysis engine 112. The reference data set engine 111 and the physical movement analysis engine 112 may each include instructions stored on one or more tangible, machine-readable storage media of the computing device 110 and executable by one or more processing devices of the computing device 110. In one embodiment, reference data set engine 111 determines a personalized reference data set 122 for the subject user 140 based on 3D motion capture data associated with a group of users performing the same physical activity as subject user 140. For example, reference data set engine 111 may further receive attribute data 146 associated with the subject user 140. The attribute data 146 may include, for example, physical characteristic data associated with the subject user 140, such as age, height, weight, gender, and/or other information, range of motion data, and/or or functional movement data. The range of motion data may define, for example, how far the subject user 140 can rotate a particular joint, and the functional movement data may indicate, for example, how well the subject user 140 can perform certain standardized body movements. Computing device 110 may receive the attribute data 146 from some other computing device, from a storage device, such as repository 120, or via direct user input. To determine the personalized reference data set 122, reference data set engine 111 may filter a collection of reference data set candidate data to identify a group of users based on a correlation of their attribute data with the attribute data 146 of the subject user, as will be described in more detail below.

In one embodiment, the physical movement analysis engine 112 may use a set of trained machine learning models 114 that are trained and used to analyze the 3D motion capture data 144 and provide a recommendation for the subject user 140 pertaining to improvement of the physical activity. The physical movement analysis engine 112 may also preprocess any received 3D motion capture data, such as 3D motion capture data 144, prior to using the data for training of the set of machine learning models 114 and/or applying the set of trained machine learning models 114 to the data. In some instances, the set of trained machine learning models 114 may be part of the physical movement analysis engine 112 or may be accessed on another machine (e.g., server machine 150) by the physical movement analysis engine 112. Based on the output of the set of trained machine learning models 114, the physical movement analysis engine 112 may obtain a recommendation for the subject user 140 pertaining to improvement of the physical activity.

Server machine 150 may be a rackmount server, a router computer, a personal computer, a portable digital assistant, a mobile phone, a laptop computer, a tablet computer, a camera, a video camera, a netbook, a desktop computer, or any combination of the above. The server machine 150 may include a training engine 151. The set of machine learning models 114 may refer to model artifacts that are created by the training engine 151 using the training data that includes training inputs and corresponding target outputs (i.e., correct answers for respective training inputs). During training, patterns in the training data that map the training input to the target output (i.e., the answer to be predicted) can be found, and are subsequently used by the machine learning models 114 for future predictions. As described in more detail below, the set of machine learning models 114 may be composed of, e.g., a single level of linear or non-linear operations (e.g., a support vector machine [SVM]) or may be a deep network, i.e., a machine learning model that is composed of multiple levels of non-linear operations). Examples of deep networks are neural networks including convolutional neural networks, recurrent neural networks with one or more hidden layers, and fully connected neural networks. Convolutional neural networks include architectures that may provide efficient physical movement analysis. Convolutional neural networks may include several convolutional layers and subsampling layers that apply filters to portions of the data to detect certain attributes/features. Whereas many machine learning models used for personalized recommendations often suffer from a lack of information about users and their behavior, as well as a lack of relevant input data, physical movement analysis engine 112 has the benefit of high quality information about the users, their physical and demographic attributes, goals and a large amount of movement data. As such, the set of machine learning models 114, and/or other artificial intelligence models may include, for example, content personalization, collaborative filtering, neural networks or statistical analysis to create high quality movement change recommendations to achieve the desired results. This level of information can allow physical movement analysis engine 112 to make very specific goal based recommendations directed to, for example, more power, speed, accuracy, flexibility, etc.

As noted above, the set of machine learning models 114 may be trained to determine a recommendation for the subject user 140 pertaining to an improvement of the physical activity using training data, as further described below. Once the set of machine learning models 114 are trained, the set of machine learning models 114 can be provided to physical movement analysis engine 112 for analysis of new 3D motion capture data. For example, reference data set engine 111 may determine a new reference data set 122 and physical movement analysis engine 112 may input the new reference data set 122 into the set of machine learning models 114. The physical movement analysis engine 112 may then obtain one or more outputs from the set of trained machine learning models 114. For example, the set of machine learning models 114 may identify, from the personalized reference data set 122, a first subset of the group of users for which a corresponding proficiency ranking is greater than a first threshold, identify, from the personalized reference data set 122, a second subset of the group of users for which a corresponding proficiency ranking is less than a second threshold, and determine at least one difference between the motion capture data associated with the first subset and the motion capture data associated with the second subset. This difference between the high performers and the lower performers corresponds to a body movement associated with performing the physical activity and the recommendation for the subject user 140 can be based on this difference. In one embodiment, the recommendation for the subject user 140 includes an indication of one or more sub-optimal body movements associated with the subject user 140 performing the physical activity. In another embodiment, the recommendation for the subject user 140 further includes an indication of at least one of a practice drill associated with the one or more sub-optimal body movements, or an image or video demonstrating a correct version of the one or more sub-optimal body movements.

The repository 120 is a persistent storage that is capable of storing 3D motion capture data 144, attribute data 146, reference data set candidate data, and a personalized reference data set 122, as well as data structures to tag, organize, and index this data. Repository 120 may be hosted by one or more storage devices, such as main memory, magnetic or optical storage based disks, tapes or hard drives, NAS, SAN, and so forth. Although depicted as separate from the computing device 110, in an implementation, the repository 120 may be part of the computing device 110. In some implementations, repository 120 may be a network-attached file server, while in other embodiments, repository 120 may be some other type of persistent storage such as an object-oriented database, a relational database, and so forth, that may be hosted by a server machine or one or more different machines coupled to the via the network 130.

Figure 2:
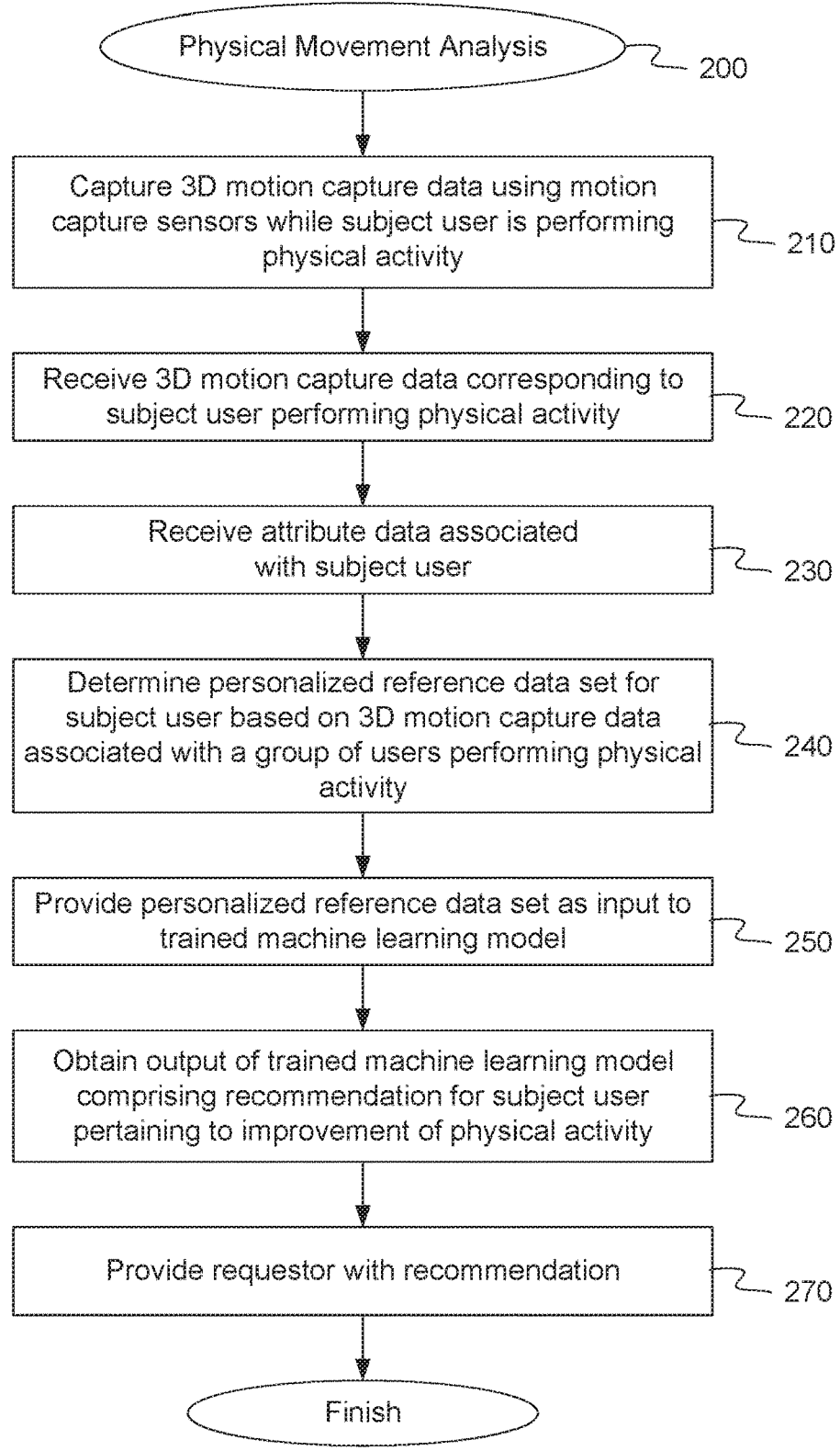
FIG. 2 is a flow diagram illustrating a physical movement analysis method in accordance with one or more aspects of the present disclosure.

FIG. 2 is a flow diagram illustrating a physical movement analysis method, in accordance with one or more aspects of the present disclosure. The method 200 may be performed by processing logic that comprises hardware (e.g., circuitry, dedicated logic, programmable logic, microcode, etc.), software (e.g., instructions run on a processor to perform hardware simulation), firmware, or a combination thereof. In one embodiment, method 200 may be performed by computing device 110 including reference data set engine 111 and physical movement analysis engine 112, as shown in FIG. 1.

Referring to FIG. 2, at block 210, method 200 captures 3D motion capture data 144 corresponding to a subject user 140 using a plurality of motion capture sensors 142 affixed to one or more body parts of the subject user 140 while the subject user 140 is performing the physical activity. In one embodiment, the motion capture sensors 142 are wireless inertial sensors, each including a gyroscope, magnetometer, accelerometer, and/or other components to measure relative positional data, rotational data, acceleration data, and/or other data. The 3D motion capture data 144 includes data representing one or more body motions associated with performing the physical activity. At block 220, method 200 receives the 3D motion capture data 144 corresponding to a subject user 140 performing the physical activity. In one embodiment, computing device 110 receives the 3D motion capture data 144 from the motion capture sensors 142 over a wireless communication link (e.g., Bluetooth). In other embodiments, the 3D motion capture data 144 may have been previously captured and stored in a database or other data store, such as repository 120. In one embodiment, the 3D motion capture data 144 is accompanied by a request or instruction to perform a physical movement analysis to generate a recommendation for the subject user 140 pertaining to improvement of the physical activity. The request may be received from a user of computing device 110, from a user of a client device coupled to computing device 110 via network 130, or from some other requestor. In one embodiment, reference data set engine 111 receives the 3D motion capture data 144 and stores the 3D motion capture data 144 in repository 120.

At block 230, method 200 receives attribute data 146 associated with the subject user 140. The attribute data 146 may include, for example, physical characteristic data associated with the subject user 140, such as age, height, weight, gender, and/or other information, range of motion data, and/or or functional movement data. The range of motion data may define, for example, how far the subject user 140 can rotate a particular joint. For example, the range of motion data may include measurements for a joint across all three axis, internal/external rotation, flexion/extension and adduction/abduction. Functional movement data may indicate, for example, how well the subject user 140 can perform certain standardized body movements such as a deep squat, jump, single leg raise, etc. In one embodiment, the attribute data 146 is received as metadata associated with the 3D motion capture data 144.

At block 240, method 200 determines a personalized reference data set 122 for the subject user 140 based on 3D motion capture data associated with a group of users performing the physical activity. In one embodiment, reference data set engine 111 generates the personalized reference data set 122 such that each user from the group of users shares at least a portion of the attribute data 146 with the subject user 140. For example, reference data set engine 111 compares the attribute data 146 associated with the subject user 140 to attribute data associated with a plurality of reference data set candidates and identifies the group of users from the plurality of reference data set candidates based on a correlation of the attribute data. Additional details with respect to determining the personalized reference data set 122 are described below with respect to FIG. 3.

At block 250, method 200 provides the personalized reference data set 122 as an input to one or more of trained machine learning models 114. In one embodiment, the set of machine learning models 114 may be composed of a single level of linear or non-linear operations, such as an SVM or deep network (i.e., a machine learning model that is composed of multiple levels of non-linear operations), such as a convolutional neural network. In one embodiment, the convolutional neural network is trained using a training data set formed from examples of motion capture data associated with users performing the physical activity as a training input and proficiency rankings that indicate how well each of the users performs the physical activity as a target output.

At block 260, method 200 obtains an output of the trained machine learning model, wherein the output comprises a recommendation for the subject user 140 pertaining to improvement of the physical activity. In one embodiment, the recommendation for the subject user 140 includes an indication of one or more sub-optimal body movements associated with the subject user 140 performing the physical activity. In another embodiment, the recommendation for the subject user 140 further includes an indication of at least one of a practice drill associated with the one or more sub-optimal body movements, or an image or video demonstrating a correct version of the one or more sub-optimal body movements. At block 270, method 200 provides the requestor with the recommendation, such as on an attached display device.

Figure 3:
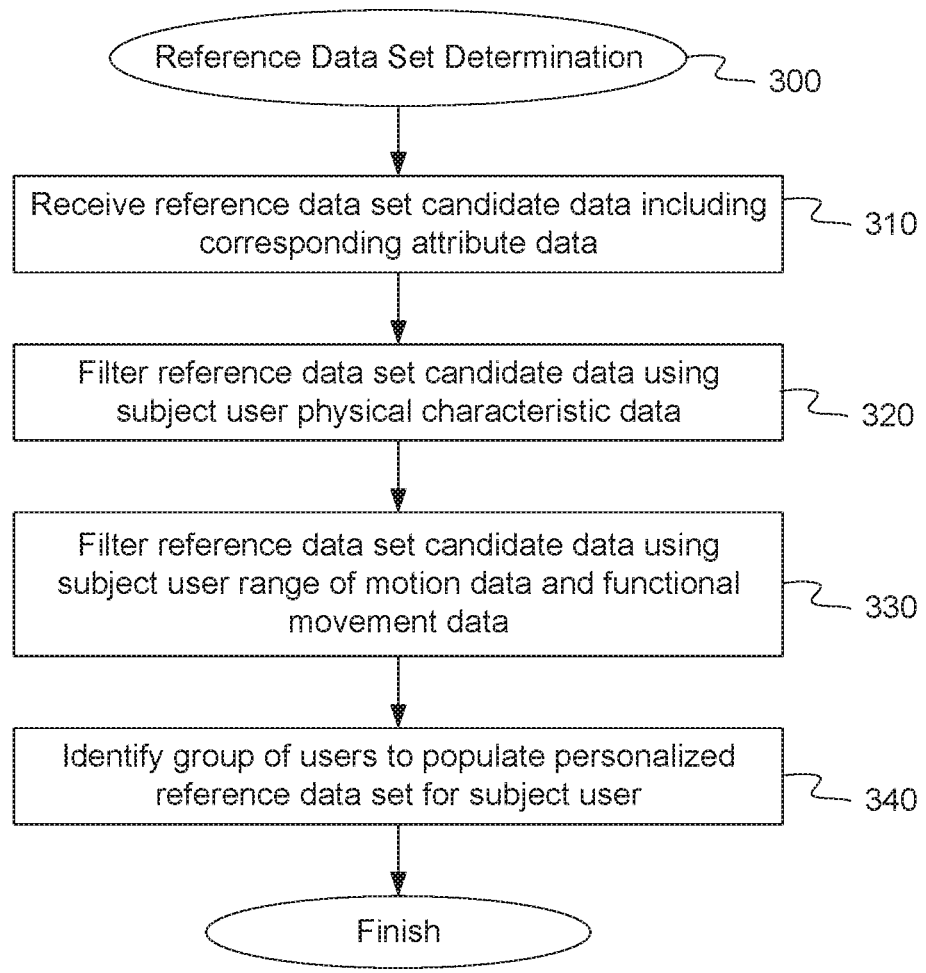
FIG. 3 is a flow diagram illustrating a reference data set determination method in accordance with one or more aspects of the present disclosure.

FIG. 3 is a flow diagram illustrating a reference data set determination method, in accordance with one or more aspects of the present disclosure. The method 300 may be performed by processing logic that comprises hardware (e.g., circuitry, dedicated logic, programmable logic, microcode, etc.), software (e.g., instructions run on a processor to perform hardware simulation), firmware, or a combination thereof. In one embodiment, method 300 may be performed by computing device 110 including reference data set engine 111 and physical movement analysis engine 112, as shown in FIG. 1.

Referring to FIG. 3, at block 310, method 300 receives reference data set candidate data including corresponding attribute data. In one embodiment, the reference data set candidate data includes 3D motion capture data corresponding to a number of users performing a physical activity, as well as the attribute data, such as physical characteristic data, range of motion data and/or functional movement data, associated with each of the number of users. In one embodiment, the reference data set candidate data is captured in the same manner as described above, using motion capture sensors 142. In another embodiment, the reference data asset candidate data was previously captured and stored in a data store, such as repository 120, from which it can be accessed by reference data set engine 111. The reference data set candidate data preferably includes 3D motion capture data corresponding to a diverse group of users having different attribute data to increase the chances of finding a candidate that shares at least a portion of the attribute data 146 with a subject user 140 being analyzed.

At block 320, method 300 filters the reference data set candidate data using physical characteristic data associated with the subject user 140 from attribute data 146. In one embodiment, reference data set engine 111 identifies a subset of the users represented in the reference data set candidate data that share the same or similar physical characteristic data as the subject user 140. For example, reference data set engine 111 may compare the attribute data 146 associated with the subject user 140 to the physical characteristic data associated with each of the users from the reference data set candidate data to identify either an exact match or a feature vector that is sufficiently similar (i.e., that meets or exceeds a similarity threshold criterion).

At block 330, method 300 filters the reference data set candidate data using range of motion data and functional movement data associated with the subject user 140 from attribute data 146. In one embodiment, reference data set engine 111 identifies a further subset of the users that share the same or similar physical characteristic data as the subject user 140. In this further subset, reference data set engine 111 examines the range of motion data and functional movement data. For example, reference data set engine 111 may compare the attribute data 146 associated with the subject user 140 to the range of motion data and functional movement data associated with each of the users from the first subset to identify either an exact match or another feature vector that is sufficiently similar (i.e., that meets or exceeds a similarity threshold criterion).

At block 340, method 300 identifies the group of users to populate the personalized reference data set 122 for the subject user 140. In one embodiment, this group of users represented in the reference data set candidate data and that match the physical characteristic data and range of motion/functional movement data of the subject user 140 are included in the personalized reference data set 122. In one embodiment, the personalized reference data set 122 is stored in repository 120 for later use by physical movement analysis engine 112.

Figure 4:
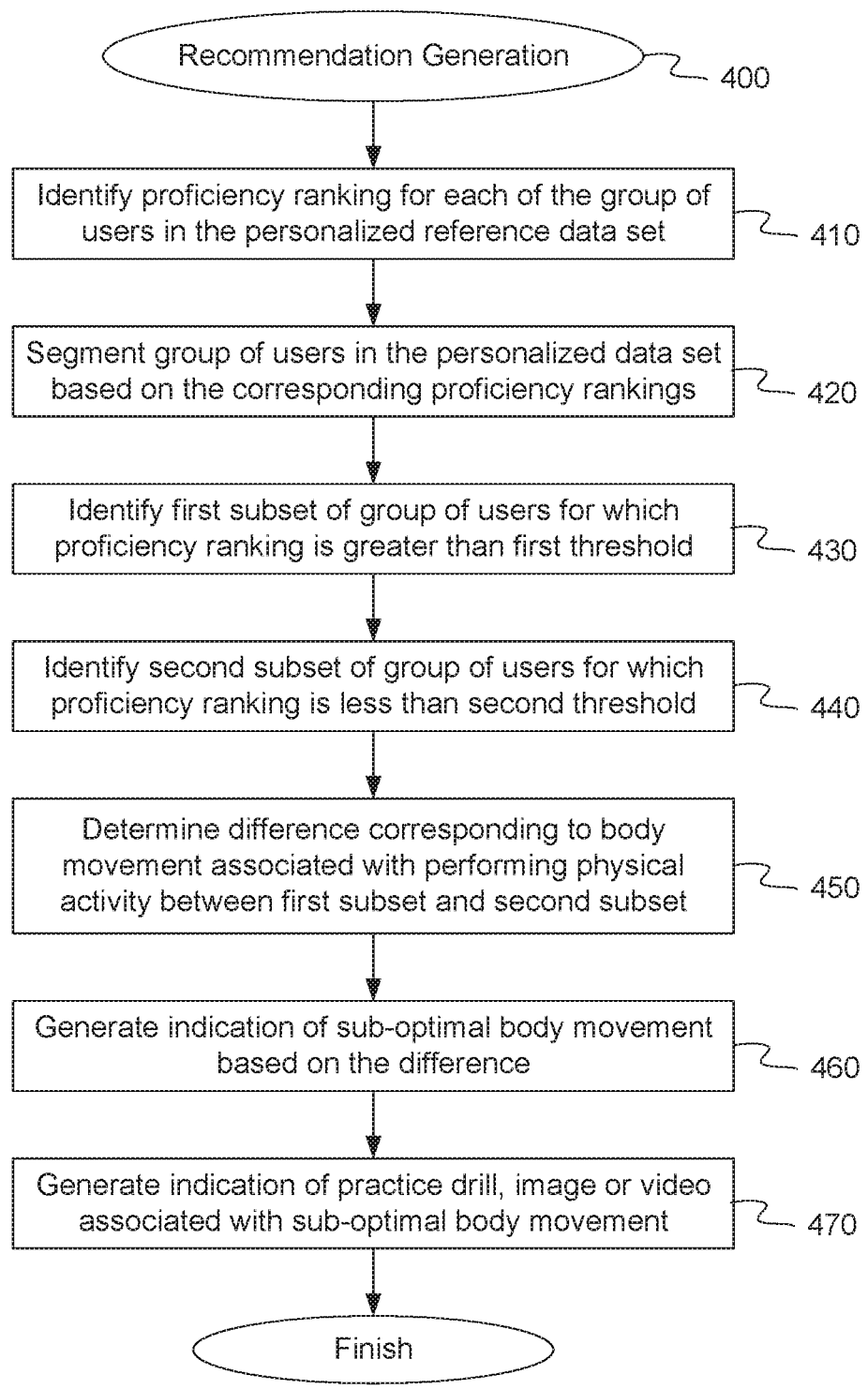
FIG. 4 is a flow diagram illustrating a recommendation generation method in accordance with one or more aspects of the present disclosure.

FIG. 4 is a flow diagram illustrating a recommendation generation method, in accordance with one or more aspects of the present disclosure. The method 400 may be performed by processing logic that comprises hardware (e.g., circuitry, dedicated logic, programmable logic, microcode, etc.), software (e.g., instructions run on a processor to perform hardware simulation), firmware, or a combination thereof. In one embodiment, method 200 may be performed by computing device 110 including reference data set engine 111 and physical movement analysis engine 112, in connection with the set of machine learning models 114, as shown in FIG. 1.

Referring to FIG. 4, at block 410, method 400 identifies a proficiency ranking for each user of the group of users in the personalized reference data set 122. In one embodiment, the proficiency ranking is an indication of how well the corresponding user performs the physical activity. An administrator or other reviewer may subjectively assign the proficiency ranking to each user to indicate their performance relative to other users. In other embodiments, the proficiency ranking may be based on objective criteria, such as speed, distance, time, etc. In one embodiment, there are separate proficiency rankings for how well the corresponding user performs each separate body movement involved in the physical activity. Once determined, the proficiency ranking data may be added to the personalized reference data set 122 and stored in repository 120.

At block 420, method 400 segments the group of users in the personalized reference data set 122 based on the corresponding proficiency rankings. In one embodiment, for example, physical movement analysis engine 112, in connection with the set of machine learning models 114 may order the group of users based on proficiency ranking (e.g., from highest to lowest) and divide the group of users into a number of segments. Depending on the embodiment, each segment may have an equal number of users (e.g., one fourth of the total users) or each segment may span an equal range of proficiency rankings (e.g., all users with a proficiency ranking from 75-100). In other embodiments, there may be any number of segments and/or the group of users may be placed in the segments according to some other criteria.

At block 430, method 400 identifies, from the personalized reference data set 122, a first subset of the group of users for which a corresponding proficiency ranking is greater than a first threshold. In one embodiment, physical movement analysis engine 112, in connection with the set of machine learning models 114, may identify the highest performing segment of users according to proficient ranking. For example, the highest performing segment may include the segment of users for which the proficiency ranking of each user meets or exceeds a first threshold (e.g., a proficiency ranking of 75).

At block 440, method 400 identifies, from the personalized reference data set 122, a second subset of the group of users for which a corresponding proficiency ranking is less than a second threshold. In one embodiment, physical movement analysis engine 112, in connection with the set of machine learning models 114, may identify the lowest performing segment of users according to proficient ranking. For example, the lowest performing segment may include the segment of users for which the proficiency ranking of each user is below a second threshold (e.g., a proficiency ranking of 25).

At block 450, method 400 determines at least one difference between the motion capture data associated with the first subset and the motion capture data associated with the second subset, where the at least one difference corresponds to a body movement associated with performing the physical activity. For example, assume that subject user 140 is a 50 year male old golfer with an 18 handicap who practices once a week and plays twice a month and would like to become a 14 handicap in 6 months. In one embodiment, reference data set engine 111, can create a personalized reference data set 122 of people who have all the characteristics of the subject user 140 where the first subset includes users with a 14 handicap and the second subset includes users with an 18 handicap. In one embodiment, physical movement analysis engine 112, in connection with the set of machine learning models 114 may determine that most of the users with 14 handicaps in the personalized reference data set 122 pronate their lead wrist at least 10 degrees in the transition of their swing while John (and other users with 18 handicaps) does/do not pronate at all, but goes/go right into supination. While there may have been any number of key differences between the subject user 140 and target reference group (i.e., the first subset), physical movement analysis engine 112 may recommend this particular change because it had the highest incidence (95% of the target group performed the pronation of the lead wrist at transition) and the amount of difference was the greatest (10 degrees of pronation compared to 0). In one embodiment, the output of the machine learning models 114 may include a rank order the differences between movements of the subject user 140 and of other users in the second subset and the target groups movements (i.e., the first subset) based on incidence and movement variance amounts.

At block 460, method 400 generates, based at least in part on the at least one difference, an indication of one or more sub-optimal body movements associated with the subject user 140 performing the physical activity. At block 470, method 400 generates, based at least in part on the at least one difference, an indication of a practice drill associated with the one or more sub-optimal body movements, or an image or video demonstrating a correct version of the one or more sub-optimal body movements.

Figure 5:
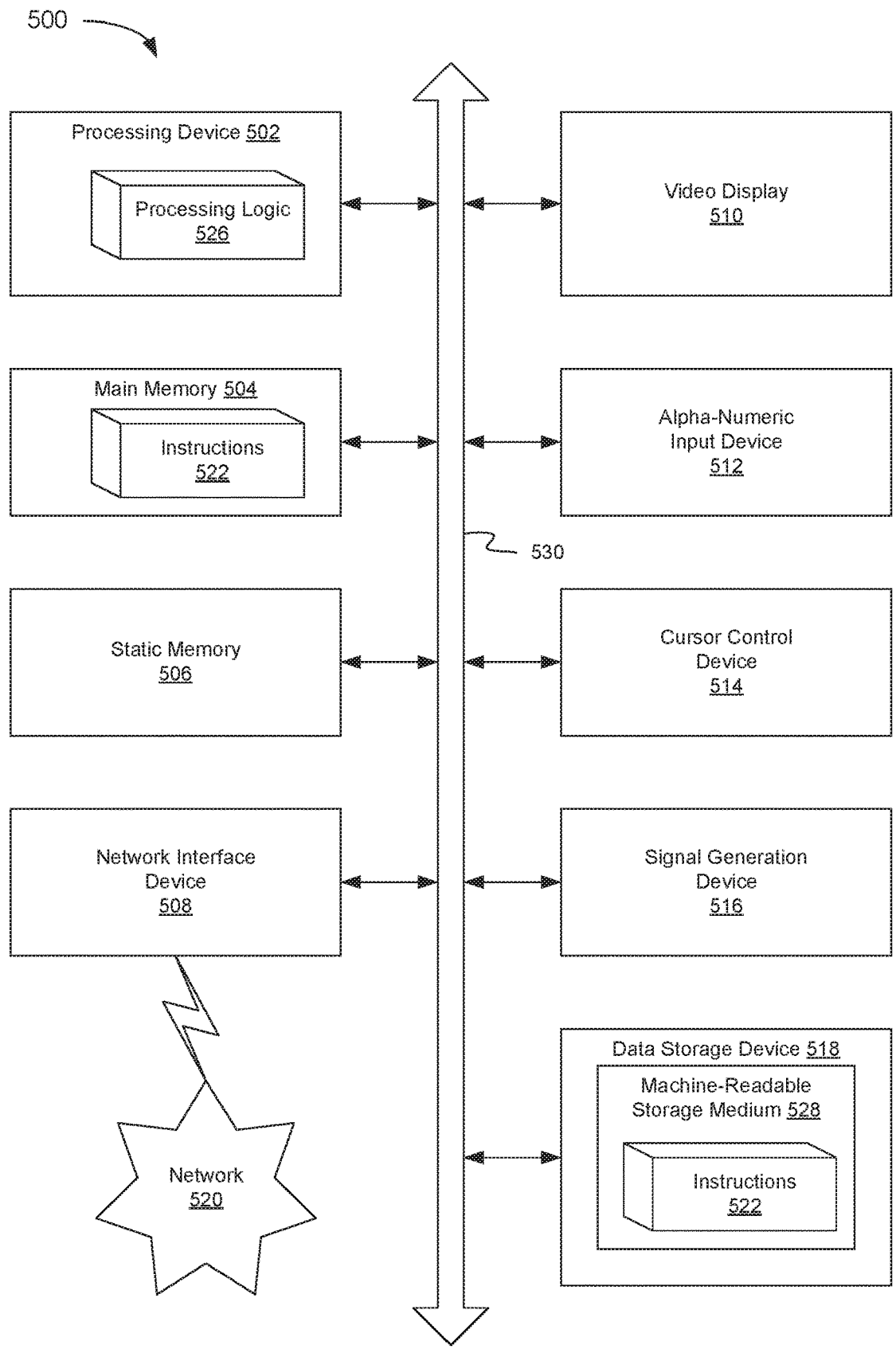
FIG. 5 depicts an example computer system which can perform any one or more of the methods described herein, in accordance with one or more aspects of the present disclosure.

FIG. 5 depicts an example computer system 500 which can perform any one or more of the methods described herein, in accordance with one or more aspects of the present disclosure. In one example, computer system 500 may correspond to a computing device capable of executing reference data set engine 111 and/or physical movement analysis engine 112 of FIG. 1. In another example, computer system 500 may correspond to a computing device capable of executing training engine 151 of FIG. 1. The computer system 500 may be connected (e.g., networked) to other computer systems in a LAN, an intranet, an extranet, or the Internet. The computer system 500 may operate in the capacity of a server in a client-server network environment. The computer system 500 may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker). In one illustrative example, the video display unit 510, the alphanumeric input device 512, and the cursor control device 514 may be combined into a single component or device (e.g., an LCD touch screen).

The data storage device 518 may include a computer-readable medium 528 on which the instructions 522 (e.g., implementing reference data set engine 111, physical movement analysis engine 112, or training engine 151) embodying any one or more of the methodologies or functions described herein is stored. The instructions 522 may also reside, completely or at least partially, within the main memory 504 and/or within the processing device 502 during execution thereof by the computer system 500, the main memory 504 and the processing device 502 also constituting computer-readable media. The instructions 522 may further be transmitted or received over a network via the network interface device 508.

While the computer-readable storage medium 528 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
receiving three dimensional (3D) motion capture data corresponding to a subject user performing a physical activity;
receiving, separately from the 3D motion capture data, first attribute data associated with the subject user;
determining, by a processing device, a personalized reference data set for the subject user based on 3D motion capture data associated with a group of users performing the physical activity, wherein each user from the group of users shares at least a portion of the first attribute data with the subject user;
providing the personalized reference data set as an input to a trained machine learning model; and
obtaining an output of the trained machine learning model, wherein the output comprises a recommendation for the subject user pertaining to improvement of the physical activity, wherein the recommendation for the subject user comprises an indication of one or more sub-optimal body movements associated with the subject user performing the physical activity, and wherein the recommendation for the subject user further comprises an indication of at least one of a practice drill associated with the one or more sub-optimal body movements, or an image or video demonstrating a correct version of the one or more sub-optimal body movements.

2. The method of claim 1, further comprising:
capturing the 3D motion capture data using a plurality of motion capture sensors affixed to one or more body parts of the subject user while the subject user is performing the physical activity.

3. The method of claim 2, wherein the 3D motion capture data comprises one or more of positional data, rotational data, or acceleration data measured by the plurality of motion capture sensors.

4. The method of claim 1, wherein the first attribute data comprises physical characteristic data associated with the subject user, the physical characteristic data comprising at least one of an age, height, weight, or gender of the subject user.

5. The method of claim 1, wherein the first attribute data comprises at least one of range of motion data or functional movement data associated with the subject user.

6. The method of claim 1, wherein determining the personalized reference data set comprises comparing the first attribute data associated with the subject user to second attribute data associated with a plurality of reference data set candidates and identifying the group of users from the plurality of reference data set candidates based on a correlation of the first attribute data with the second attributed data.

7. The method of claim 1, wherein, when executed, the trained machine learning model is configured to:
identify, from the personalized reference data set, a first subset of the group of users for which a corresponding proficiency ranking is greater than a first threshold;
identify, from the personalized reference data set, a second subset of the group of users for which a corresponding proficiency ranking is less than a second threshold; and
determine at least one difference between 3D motion capture data associated with the first subset and 3D motion capture data associated with the second subset, the at least one difference corresponding to a body movement associated with performing the physical activity.

8. The method of claim 7, wherein the recommendation for the subject user pertaining to improvement of the physical activity is based at least in part on the at least one difference.

9. The method of claim 1 wherein the trained machine learning model is trained using a training data set, the training data set comprising examples of 3D motion capture data associated with users performing the physical activity as a training input and proficiency rankings that indicate how well each of the users performs the physical activity as a target output.

10. A system comprising:
a memory device storing instructions;
a processing device coupled to the memory device, the processing device to execute the instructions to:
receive three dimensional (3D) motion capture data corresponding to a subject user performing a physical activity;
receive, separately from the 3D motion capture data, first attribute data associated with the subject user;
determine a personalized reference data set for the subject user based on 3D motion capture data associated with a group of users performing the physical activity, wherein each user from the group of users shares at least a portion of the first attribute data with the subject user;
provide the personalized reference data set as an input to a trained machine learning model; and
obtain an output of the trained machine learning model, wherein the output comprises a recommendation for the subject user pertaining to improvement of the physical activity, wherein the recommendation for the subject user comprises an indication of one or more sub-optimal body movements associated with the subject user performing the physical activity and an indication of at least one of a practice drill associated with the one or more sub-optimal body movements, or an image or video demonstrating a correct version of the one or more sub-optimal body movements.

11. The system of claim 10, wherein the processing device to execute the instructions further to:
capture the 3D motion capture data using a plurality of motion capture sensors affixed to one or more body parts of the subject user while the subject user is performing the physical activity, wherein the 3D motion capture data comprises one or more of positional data, rotational data, or acceleration data measured by the plurality of motion capture sensors.

12. The system of claim 10, wherein the first attribute data comprises at least one of physical characteristic data, range of motion data, or functional movement data associated with the subject user, the physical characteristic data comprising at least one of an age, height, weight, or gender of the subject user.

13. The system of claim 10, wherein to determine the personalized reference data set, the processing device to execute the instructions to compare the first attribute data associated with the subject user to second attribute data associated with a plurality of reference data set candidates and identify the group of users from the plurality of reference data set candidates based on a correlation of the first attribute data with the second attributed data.

14. The system of claim 10, wherein, when executed, the trained machine learning model is configured to:
identify, from the personalized reference data set, a first subset of the group of users for which a corresponding proficiency ranking is greater than a first threshold;
identify, from the personalized reference data set, a second subset of the group of users for which a corresponding proficiency ranking is less than a second threshold; and
determine at least one difference between 3D motion capture data associated with the first subset and 3D motion capture data associated with the second subset, the at least one difference corresponding to a body movement associated with performing the physical activity, wherein the recommendation for the subject user pertaining to improvement of the physical activity is based at least in part on the at least one difference.

15. The system of claim 10, wherein the recommendation for the subject user comprises an indication of one or more sub-optimal body movements associated with the subject user performing the physical activity and an indication of at least one of a practice drill associated with the one or more sub-optimal body movements, or an image or video demonstrating a correct version of the one or more sub-optimal body movements.

16. A non-transitory computer-readable storage medium storing instructions that, when executed by a processing device, cause the processing device to:

receive three dimensional (3D) motion capture data corresponding to a subject user performing a physical activity;

receive, separately from the 3D motion capture data, first attribute data associated with the subject user;

determine a personalized reference data set for the subject user based on 3D motion capture data associated with a group of users performing the physical activity, wherein each user from the group of users shares at least a portion of the first attribute data with the subject user;

provide the personalized reference data set as an input to a trained machine learning model; and obtain an output of the trained machine learning model, wherein the output comprises a recommendation for the subject user pertaining to improvement of the physical activity, wherein the recommendation for the subject user comprises an indication of one or more sub-optimal body movements associated with the subject user performing the physical activity and an indication of at least one of a practice drill associated with the one or more sub-optimal body movements, or an image or video demonstrating a correct version of the one or more sub-optimal body movements.

17. The non-transitory computer-readable storage medium of claim 16, wherein the instructions further cause the processing device to:

capture the 3D motion capture data using a plurality of motion capture sensors affixed to one or more body parts of the subject user while the subject user is performing the physical activity, wherein the 3D motion capture data comprises one or more of positional data, rotational data, or acceleration data measured by the plurality of motion capture sensors, and wherein the first attribute data comprises at least one of physical characteristic data, range of motion data, or functional movement data associated with the subject user, the physical characteristic data comprising at least one of an age, height, weight, or gender of the subject user.

\* \* \* \* \*